US009671899B2

(12) United States Patent
Kim et al.

(10) Patent No.: US 9,671,899 B2
(45) Date of Patent: Jun. 6, 2017

(54) DISPLAY DEVICE AND METHOD OF DRIVING THE SAME

(71) Applicant: LG Display Co., Ltd., Seoul (KR)

(72) Inventors: Min Sung Kim, Seoul (KR); Hyung Uk Jang, Paju-si (KR); Jin Soo Chung, Paju-si (KR); Yoonion Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/726,035

(22) Filed: May 29, 2015

(65) Prior Publication Data

US 2016/0188081 A1  Jun. 30, 2016

(30) Foreign Application Priority Data

Dec. 31, 2014  (KR) .......................... 10-2014-0196061

(51) Int. Cl.
 *G06F 3/041* (2006.01)
 *G06F 3/044* (2006.01)
(52) U.S. Cl.
 CPC ............ *G06F 3/0416* (2013.01); *G06F 3/044* (2013.01); *G06F 3/0412* (2013.01); *G06F 2203/04103* (2013.01)
(58) Field of Classification Search
 CPC .................. G06F 3/044; G06F 3/0412; G06F 2203/04103; G06F 3/0416
 See application file for complete search history.

(56) References Cited

U.S. PATENT DOCUMENTS

| 8,525,799 B1* | 9/2013 | Grivna | .................. | G06F 3/0416 345/173 |
| 8,674,709 B2* | 3/2014 | Kim | ........................ | G06F 3/044 178/18.06 |

(Continued)

FOREIGN PATENT DOCUMENTS

| EP | 2811379 A1 | 12/2014 |
| KR | 10-1315227 | 10/2013 |
| KR | 10-2014-0060712 | 5/2014 |

OTHER PUBLICATIONS

Extended European Search Report for European Patent Application No. EP 15189740, Feb. 18, 2016, 8 Pages.

(Continued)

*Primary Examiner* — Michael J Jansen, II
(74) *Attorney, Agent, or Firm* — Fenwick & West LLP (57) ABSTRACT

In touch panel display device, a first touch electrode group has a first plurality of touch electrodes and a second touch electrode group has a second plurality of touch electrodes. A first current supplier circuit supplies a first current during a first current supply period to the first touch electrode group, and the second current supplier circuit supplies a second current during a second current supply period to the second touch electrode group. The sensing signal receiver circuit holds a first touch voltage for the first touch electrode group following the first current supply period, and holds the second touch voltage for the second touch electrode group following the second current supply period. The sensing signal receiver determines based on the first held touch voltage and the second held touch voltage, whether a touch occurred in each of the first touch electrode group and the second touch electrode group.

6 Claims, 9 Drawing Sheets

(56) References Cited

U.S. PATENT DOCUMENTS

| | | | | |
|---|---|---|---|---|
| 8,866,792 B2* | 10/2014 | Wang | ................ | G06F 3/044 178/18.06 |
| 2008/0158198 A1 | 7/2008 | Elias | | |
| 2011/0073384 A1* | 3/2011 | Osoinach | ............ | G06F 3/0416 178/18.06 |
| 2011/0175847 A1* | 7/2011 | Wang et al. | ................ | 345/174 |
| 2011/0279131 A1* | 11/2011 | Kim | ................ | G06F 3/044 324/679 |
| 2012/0050229 A1* | 3/2012 | Tenuta | ................ | G06F 3/044 345/178 |
| 2012/0176179 A1* | 7/2012 | Harders | ............ | H03K 17/962 327/517 |
| 2012/0217981 A1 | 8/2012 | Erdogan et al. | | |
| 2013/0169340 A1 | 7/2013 | Tao et al. | | |
| 2013/0215075 A1* | 8/2013 | Lee | ................ | G06F 3/044 345/174 |
| 2013/0278538 A1* | 10/2013 | Brunet | ................ | G06F 3/044 345/174 |
| 2013/0300707 A1 | 11/2013 | Hershman | | |
| 2013/0321296 A1* | 12/2013 | Lee | ................ | G06F 3/041 345/173 |
| 2013/0342498 A1 | 12/2013 | Kim et al. | | |
| 2014/0132559 A1* | 5/2014 | Kim | ................ | 345/174 |
| 2014/0176488 A1 | 6/2014 | Jo | | |
| 2014/0253498 A1* | 9/2014 | Suzuki | ................ | G06F 3/044 345/174 |
| 2015/0049043 A1* | 2/2015 | Yousefpor | ............ | G06F 3/044 345/174 |
| 2015/0049044 A1* | 2/2015 | Yousefpor | ............ | G06F 3/044 345/174 |

OTHER PUBLICATIONS

Office Action for Korean Patent Application No. KR 10-2014-0196061, Jan. 30, 2017, 7 Pages, (With Concise Explanation of Relevance).

* cited by examiner

//DISPLAY DEVICE AND METHOD OF DRIVING THE SAME

CROSS-REFERENCE TO RELATED APPLICATIONS

This application claims the benefit of the Korean Patent Application No. 10-2014-0196061 filed on Dec. 31, 2014, which is hereby incorporated by reference as if fully set forth herein.

BACKGROUND

Field of the Invention

The present invention relates to a display device, and particularly, to a display device with a built-in self-capacitive touch panel and a method of driving the same.

Discussion of the Related Art

Touch panels are a type of input device that is included in display devices such as liquid crystal display (LCD) devices, plasma display panels (PDPs), organic light emitting display device (OLED), and electrophoretic displays (EPDs), and enables a user to input information by directly touching a screen with a finger, a pen or the like while looking at the screen of the display device.

A touch panel may be manufactured independently from a panel configuring a display device, and then may be attached to an upper end surface of the panel or may be provided as one body with the panel.

For example, the touch panel may be categorized into an in-cell type in which the touch panel is built into the panel displaying an image, an on-cell type in which the touch panel is provided on the panel, and an add-on type in which the touch panel is manufactured independently from the panel and then is attached to an upper end of the panel.

Figure 1:
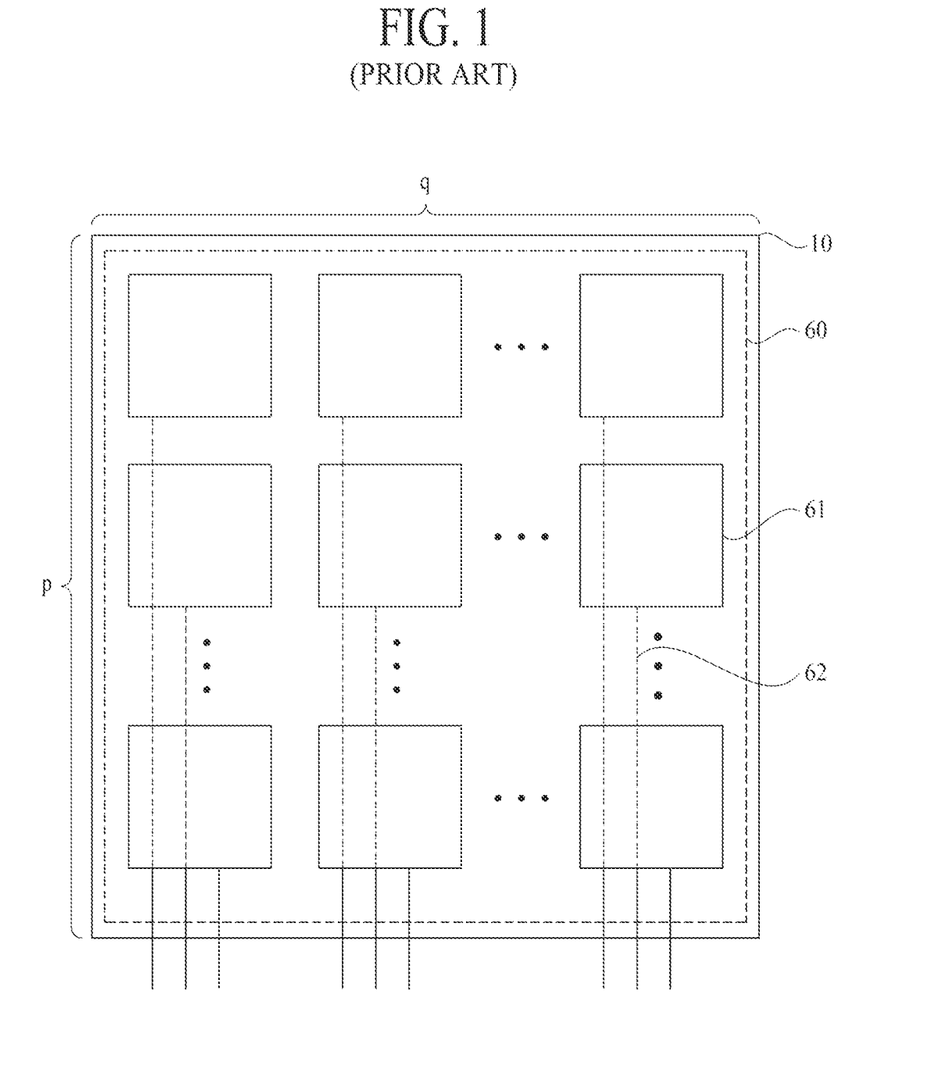
FIG. 1 is an exemplary diagram illustrating a configuration of a related art display device.

FIG. 1 is an exemplary diagram illustrating a configuration of a related art display device.

The related art display device including a touch panel, as illustrated in FIG. 1, includes a panel 10 where a touch panel 60 is provided and a touch sensing unit (not shown) that drives the touch panel 60.

A method of driving the touch panel 60 may be divided into a resistive type and a capacitance type. The capacitance type may be categorized into a self-capacitance type and a mutual type.

When a related art display device having the self-capacitance type includes the touch panel 60 that includes q number of touch electrodes which are arranged in a horizontal direction and p number of touch electrodes which are arranged in a vertical direction, "q×p=n" number of touch electrode lines 62 are connected to the touch sensing unit.

When the touch electrodes 61 have the same characteristic, whether each of the touch electrodes 61 is touched may be determined by the touch sensing unit.

However, the touch electrodes 61 configuring the touch panel 60 have different characteristics due to a problem of a manufacturing process or an interaction with various electrodes which are disposed near the touch electrodes 61. For this reason, it is difficult for the touch electrodes 61 to accurately sense a touch. Particularly, when the touch panel 60 is built into the panel 10, characteristics of the touch electrodes 61 differ due to various peripheral factors of the touch electrodes 61.

For example, when a characteristic of a specific touch electrode differs from characteristics of the other touch electrodes, despite the specific touch electrode being actually touched, the touch sensing unit cannot determine that the specific touch electrode is touched.

Moreover, even when the specific touch electrode is not actually touched, the touch sensing unit can determine that the specific touch electrode is touched.

SUMMARY

In a first embodiment, a touch panel display device comprises first and second touch electrode groups, first and second current supplier circuits, and a sensing signal receiver. The first touch electrode group has a first plurality of touch electrodes. A first touch voltage of the first touch electrode group increases in response to a first current applied to the first plurality of touch electrodes. The second touch electrode group has a second plurality of touch electrodes. A second touch voltage of the second touch electrode group increases in response to a second current applied to the second plurality of touch electrodes. The first current supplier circuit supplies the first current during a first current supply period in accordance with a first current parameter, and the second current supplier circuit supplies the second current during a second current supply period in accordance with a second current parameter. The sensing signal receiver circuit holds a first touch voltage for the first touch electrode group following the first current supply period, and holds the second touch voltage for the second touch electrode group following the second current supply period. The sensing signal receiver determines based on the first held touch voltage and the second held touch voltage, whether a touch occurred in each of the first touch electrode group and the second touch electrode group.

In a second embodiment, a method for operating the touch panel display device described above is provided.

In a third embodiment, a method for manufacturing a touch panel display device is provided. A test current is supplied to each of a plurality of touch electrodes in a first touch electrode group and a second touch electrode group during a charge period. A first touch voltage of the first touch electrode group and a second touch voltage of the second touch electrode group increase at different rates in response to the test current. The first touch voltage for the first touch electrode group and the second touch voltage for the second touch electrode group are held following the charge period. A difference is determined between the first held touch voltage and the second held touch voltage. A first current parameter associated with the first touch electrode group and a second current parameter associated with the second touch electrode group are determined based on the difference between the first held touch voltage and the second held touch voltage, the first current parameter different than the second current parameter. A current supplier circuit is configured to supply a first current in accordance with the first current parameter to the first touch electrode group and to supply a second current in accordance with the second current parameter to the second touch electrode group.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Hereinafter, for convenience of a description, an LCD device will be described as an example of the present invention, but the present invention is not limited thereto. That is, the present invention may be applied various display devices that display an image by using a common electrode and a common voltage.

Figure 2:
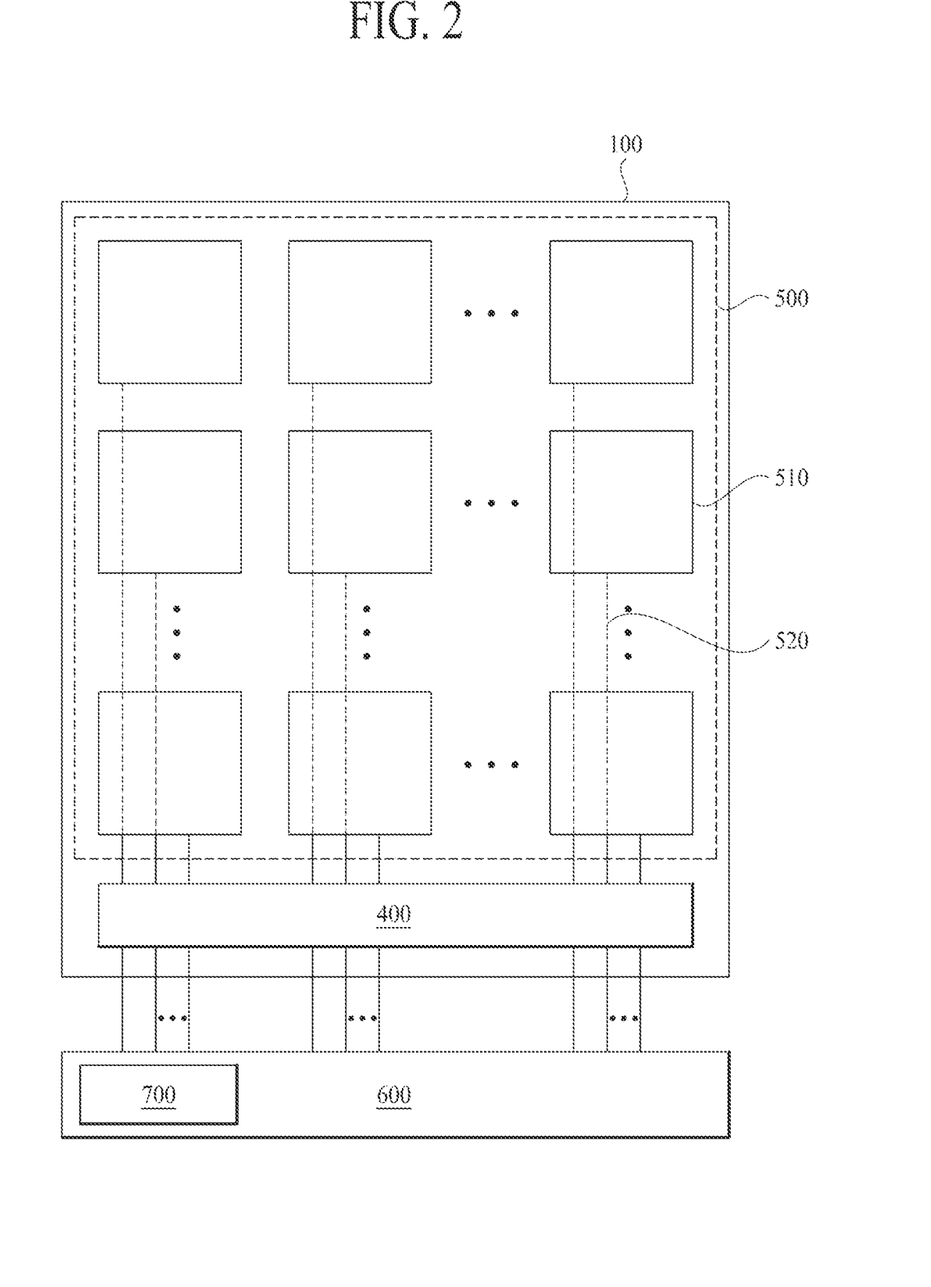
FIG. 2 is an exemplary diagram schematically illustrating a configuration of a display device according to an embodiment of the present invention.

FIG. 2 is an exemplary diagram schematically illustrating a configuration of a display device according to an embodiment of the present invention.

The present invention relates to a display device where an in-cell touch panel is provided. The in-cell touch panel is built into a panel configuring the display device.

A method of driving the in-cell touch panel may be divided into a resistive type and a capacitance type.

The capacitance type may be categorized into a self-capacitance type and a mutual type.

A touch panel having the mutual type includes a plurality of driving electrodes, which receive a touch signal, and a plurality of receiving electrodes which respectively supply a plurality of sensing signals to a touch sensing unit.

A touch panel having the self-capacitance type includes a plurality of touch electrodes that perform the same function.

The present invention uses the self-capacitance type.

That is, the present invention relates to a display device, which includes the in-cell touch panel and uses the self-capacitance type, and a method of driving the same.

The display device according to an embodiment of the present invention, as illustrated in FIG. 2, includes: a panel 100 into which a self-capacitive touch panel 500 including a plurality of touch electrodes 510 is built; a storage unit 700 that stores pieces of touch electrode information about characteristics of the touch electrodes 510; a touch sensing unit 600 that changes driving conditions of the touch electrodes 510 by using the pieces of touch electrode information, and by using a plurality of sensing signals respectively received from the touch electrodes 510, determines whether the touch panel 500 is touched; and a driver 400 that respectively outputs image signals to a plurality of data lines included in the panel 100 and sequentially outputs a gate pulse to a plurality of gate lines included in the panel 100.

The panel 100 may perform a function of displaying an image.

When the display device according to an embodiment of the present invention is an LCD device, the panel 100 may include a color filter (CF) substrate, a thin film transistor (TFT) substrate where the gate lines and the data lines are provided, and a liquid crystal that is injected between the CF substrate and the TFT substrate.

The touch panel 500 including the touch electrodes 510 may be built into the panel 100. Here, each of the touch electrodes 510 configuring the touch panel 500 may act as a common electrode, which receives a common voltage, and a touch electrode which receives a touch signal.

For example, during an image display period, the common voltage may be supplied to the touch electrodes 510, data voltages may be respectively supplied to a plurality of pixel electrodes, which are respectively provided in a plurality of pixels, through the data lines, and the gate pulse may be supplied to the gate lines. When the gate pulse is supplied, the liquid crystal may be driven by a difference voltage between the common voltage and a data voltage supplied to each of the pixel electrodes. A transmittance of the liquid crystal may be changed according to the difference voltage, and thus, an image may be displayed by the panel 100.

During a touch sensing period, the touch signal may be supplied to the touch electrodes 510. The touch signal may be a current or a voltage. In this case, by using the sensing signals respectively received from the touch electrodes 510, the touch sensing unit 600 may determine whether there is a touch or detect a touched position.

In order to perform the above-described function, the TFT substrate may include the gate lines (not shown), the data lines (not shown), the touch electrodes 510, and the pixel electrodes (not shown).

The CF substrate may include a red color filter, a green color filter, and a blue color filter that divide a red pixel, a green pixel, and a blue pixel.

As described above, the touch panel 500 may include the touch electrodes 510. The touch electrodes 510 may be respectively provided in the plurality of pixels which are provided in the panel 100.

Each of the touch electrodes 510 may be connected to the touch sensing unit 600 through a touch electrode line 520.

During the touch sensing period, the touch signal may be supplied to the touch electrodes 510. During the image display period, the common voltage may be supplied to the touch electrodes 510.

During the touch sensing period, the touch electrodes 510 may be supplied with a current or a voltage from the touch sensing unit 600, and thus, a voltage of each of the touch electrodes 510 may increase.

During the image display period, the touch electrodes 510 may drive the liquid crystal along with the respective pixel electrodes which are provided in the plurality of pixels.

The touch panel 500 according to an embodiment of the present invention, as described above, may be built into the panel 100 in a capacitance type. That is, each of the touch electrodes 510 included in the touch panel 500 may perform a function of the common electrode that drives the liquid crystal along with each of the pixel electrodes, and may act as an element for determining whether there is a touch.

The driver 400 may include a gate driver that controls signals supplied through the gate lines, a data driver that controls signals supplied through the data lines, and a controller that controls the gate driver and the data driver.

Figure 4:
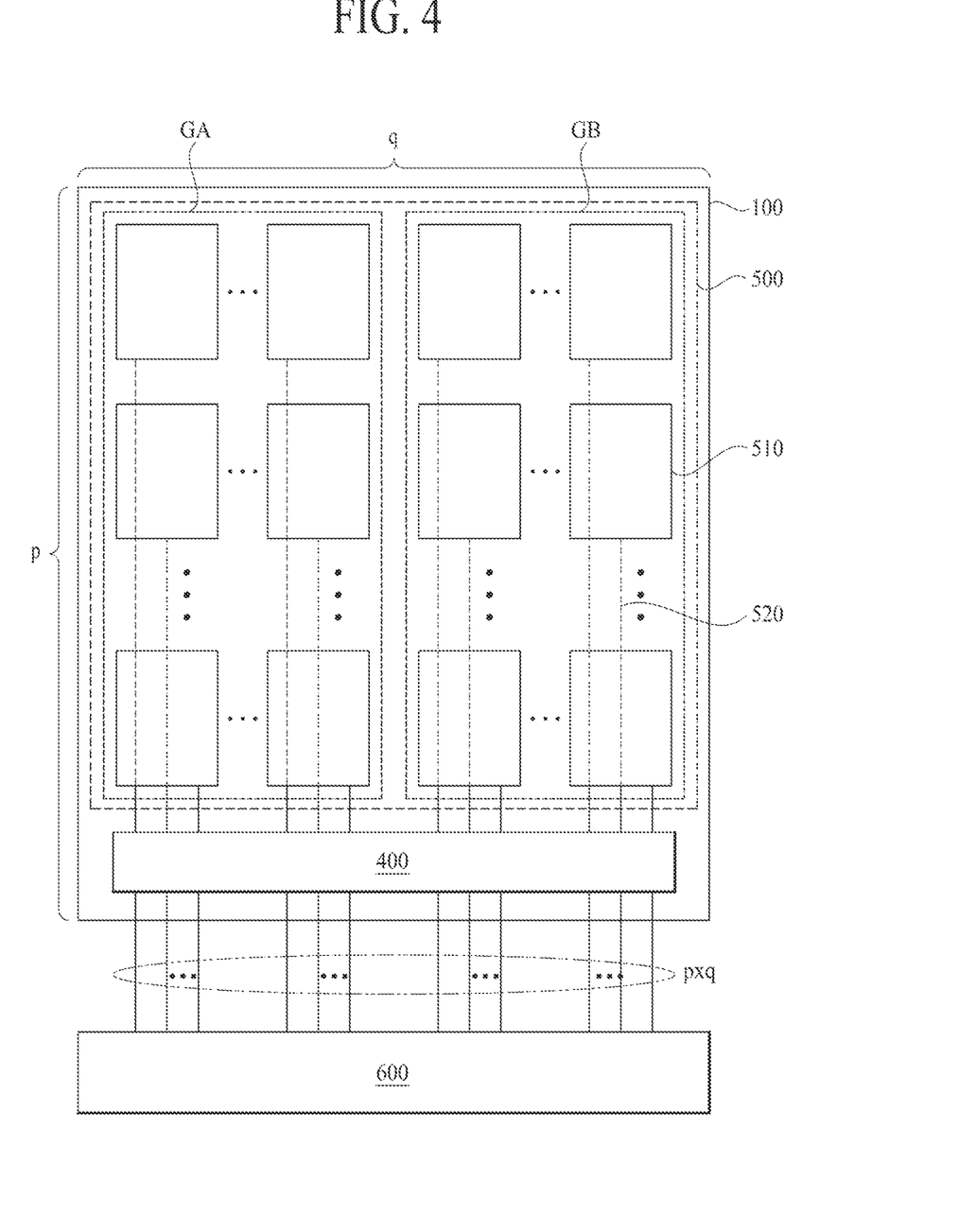
FIG. 4 is an exemplary diagram illustrating a plurality of touch electrodes included in a display device according to an embodiment of the present invention.

The gate driver, the data driver, and the controller which configure the driver 400 may be integrated into one integrated circuit (IC) as illustrated in FIG. 4, or may be separately provided. For example, when the data driver and the controller are integrated into one IC, the gate driver may be integrated into the panel 100 in a gate-in panel (GIP) type or may be mounted on the panel 100 as a separate IC.

First, the controller may receive a plurality of timing signals, such as a data enable signal, a dot clock, etc., from an external system to generate a plurality of control signals for controlling operation timings of the data driver and the gate driver. Also, the controller may realign input video data received from the external system to output realigned image data to the data driver.

The controller may generate a control signal for controlling an operation of the touch sensing unit 600 and transfer the control signal to the touch sensing unit 600.

During the image display period, the common voltage output to the touch electrodes 510 may be generated by a common voltage generator (not shown) and may be output to the touch electrodes 510 through the driver 400, or may be output to the touch electrodes 510 through the touch sensing unit 600. Also, the touch signal may be supplied to the touch electrodes 510 through the touch sensing unit 600 which has received the control signal from the driver 400. Alternatively, the touch signal may be output to the touch sensing unit 600 and then may be supplied to the touch electrodes 510 through the driver 400.

Second, during the image display period, the data driver may convert the image data, input from the controller, into analog data voltages and may respectively supply data voltages, for one horizontal line, to the data lines at every one horizontal period where the gate pulse is supplied to one gate line. For example, the data driver may convert the image data into the data voltages by using gamma voltages supplied from a gamma voltage generator (not shown), and then may respectively output the data voltages to the data lines during the image display period.

Third, the gate driver may sequentially supply the gate pulse to the gate lines by using gate control signals generated by the controller.

The storage unit 700 may store the pieces of touch electrode information about characteristics of the touch electrodes 510.

For example, the touch electrode information may include information about an amount of current which is to be supplied to the touch electrodes 510, or include information about a period where a current is supplied to the touch electrodes 510.

In this case, the pieces of touch electrode information may respectively correspond to the touch electrodes 510.

Moreover, the touch electrode information may correspond to a touch electrode group which includes two or more the touch electrodes 510. For example, when fifty the touch electrodes 510 constitute one touch electrode group, and hundred the touch electrodes 510 included in two touch electrode groups configure the touch panel 500, the storage unit 700 may store two pieces of touch electrode information respectively corresponding to the two touch electrode groups.

The storage unit 700, as illustrated in FIG. 2, may be included in the touch sensing unit 600 or may be included in the controller 400. Alternatively, the storage unit 700 may be provided independently from the touch sensing unit 600 and the controller 400.

Finally, the touch sensing unit 600 may change the driving conditions of the touch electrodes 510 by using the pieces of touch electrode information, and by using the sensing signals respectively received from the touch electrodes 510, the touch sensing unit 500 may determine whether the touch panel 500 is touched.

The driving condition may be an amount of current supplied to the touch electrodes 510 or may be a period where a current is supplied to the touch electrodes 510.

A detailed function and an operation method of the touch sensing unit 600 will be described in detail with reference to FIGS. 3 to 5.

Figure 3:
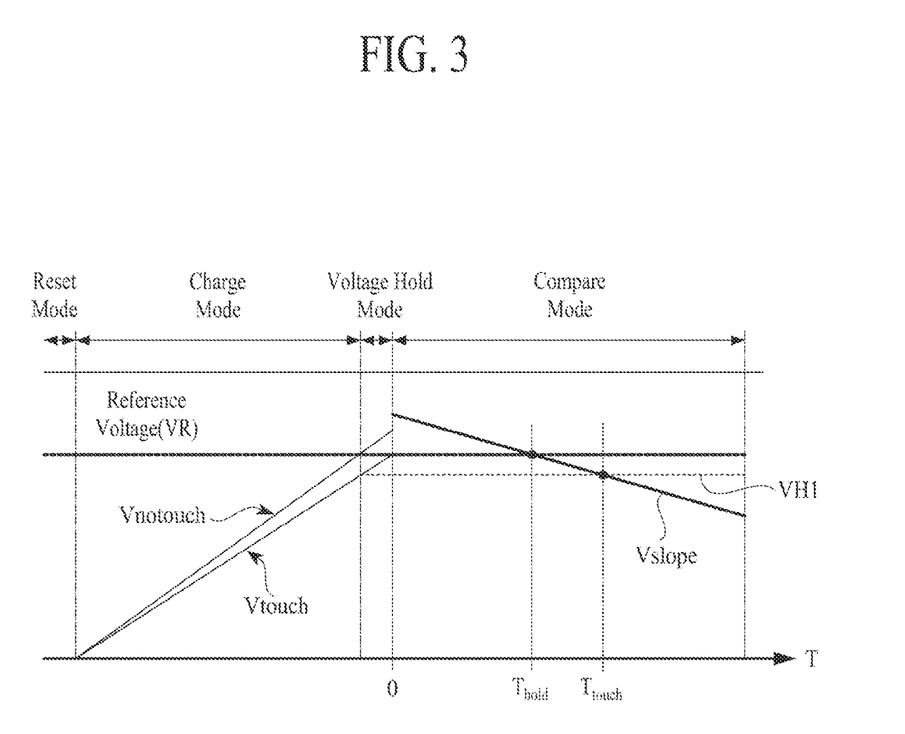
FIG. 3 is an exemplary diagram for describing a method of driving a display device according to an embodiment of the present invention.

FIG. 3 is an exemplary diagram for describing a method of driving a display device according to an embodiment of the present invention.

The method of driving the display device according to an embodiment of the present invention will be briefly described below.

First, during the touch sensing period in one frame period, the touch sensing unit 600 may supply a current to the touch electrodes 510. Therefore, in a charge mode shown in FIG. 3, touch voltages Vnotouch and Vtouch of the touch electrodes 510 increase. Among two the touch voltages Vnotouch and Vtouch shown in FIG. 3, the touch voltage Vtouch indicates a touch voltage of a touch electrode which is being touched, and the touch voltage Vnotouch indicates a touch voltage of an untouched touch electrode.

Before supplying a current to the touch electrodes 510, a reset operation of removing a current which remains in the touch electrodes 510 may be performed. That is, in a reset mode shown in FIG. 3, the touch sensing unit 600 may apply a certain voltage to each of the touch electrodes 510 to shift a voltage of each touch electrode 510 to 0.

That is, in the charge mode, a certain current (Charge Pump) may be applied to the touch electrodes 510 whose voltage is 0, and thus, a touch voltage of each of the touch electrodes 510 linearly increases.

In this case, FIG. 3 shows a state where the touch voltage of each of the touch electrodes 510 increases in an ideal case where the touch electrodes 510 have the same characteristic. Therefore, a voltage of each of the touch electrodes 510 may be Vtouch or Vnotouch.

In a voltage hold mode, touch voltages which have linearly increased according to a current being increased may be held, and thus hold voltages VR and VH1 may be generated. A first hold voltage VH1 shown in FIG. 3 may denote a hold voltage of a touch electrode which is being touched, and a reference hold voltage VR may denote a hold voltage of an untouched touch electrode.

For example, as illustrated in FIG. 3, even when a current equal to a current supplied to an untouched touch electrode is supplied to a touched touch electrode, an increase speed of the touch voltage Vtouch is lowered in the touched touch electrode. Therefore, a level of the hold voltage VH1 at the touched touch electrode at a timing when the voltage hold mode arrives is lower than that of the reference hold voltage VR at the untouched touch electrode at a timing when the voltage hold mode arrives.

In the compare mode, the touch sensing unit 600 may generate a slope voltage Vslope and measure a period where the slope voltage reaches the hold voltage VR or VH1.

In this case, when there is no a touch, the touch sensing unit 600 may store a period where the slope voltage Vslope reaches the reference hold voltage VR.

Therefore, a period Tnotouch where the slope voltage reaches the reference hold voltage VR generated at an untouched touch electrode is the same as a pre-stored period. Therefore, the touch sensing unit 600 determines that there is no touch in a touch electrode where a voltage of the touch electrode increases to the touch voltage Vnotouch.

However, in the touch electrode where the voltage of the touch electrode increases to the touch voltage Vtouch, a time Ttouch when the slope voltage Vslope reaches the first hold voltage VH1 is longer than a time Tnotouch when the slope voltage reaches the reference hold voltage VR. In this case, the touch sensing unit 600 may determine that there is a touch in a touch electrode where the first hold voltage VH1 is generated. In other words, a touch is determined by detecting a period for the slope voltage Vslope to cross the first hold voltage VH1 or the reference hold voltage VR and detecting a touch only if the measured period meets a predefined criteria.

By using the above-described method, the touch sensing unit 600 may determine whether there is a touch in all the touch electrodes 510 included in the touch panel 500.

In this case, the touch sensing unit 600 may receive the sensing signals from the touch electrodes, and then may determine whether there is a touch and detect a touched position through the above-described method.

However, the touch sensing unit 600 may perform only a function of converting analog sensing signals, respectively transferred from the touch electrodes, into digital sensing signals. In this case, an operation of determining whether there is a touch and detecting a touched position by using the digital sensing signals may be performed by a separate element. Particularly, an element for determining whether there is a touch and an element for detecting a touched position may be separately provided.

To provide an additional description, the touch sensing unit 600 may perform only the function of converting the analog sensing signals, respectively transferred from the touch electrodes, into the digital sensing signals. Also, the touch sensing unit 600 may determine whether there is a touch by using the digital sensing signals and detect a touched position of the touch panel 500.

FIG. 4 is an exemplary diagram illustrating a plurality of touch electrodes included in a display device according to an embodiment of the present invention, and particularly, illustrates a touch panel 500 where a plurality of touch electrodes are divided into two touch electrode groups GA and GB. Hereinafter, details which are the same as or similar to details described above with reference to FIGS. 2 and 3 are not repeated or will be briefly described.

For example, the touch panel 500 may include "p×q" number of touch electrodes 510.

First, in the example, the pieces of touch electrode information may respectively correspond to the touch electrodes 510. In this case, the number of the pieces of touch electrode information may be "p×q". The storage unit 700 may store the "p×q" pieces of touch electrode information.

The touch sensing unit 700 may separately drive the touch electrodes 510, based on the pieces of touch electrode information.

Second, the touch electrodes 510 may be divided into at least two touch electrode groups. In this case, the storage unit 700 may store the pieces of touch electrode information about the respective touch electrode groups.

The touch sensing unit may drive the touch electrode groups under separate conditions, based on the pieces of touch electrode information.

Particularly, as illustrated in FIG. 4, the touch electrodes 510 may be included in a first touch electrode group GA or a second touch electrode group GB. In this case, as illustrated in FIG. 4, the first touch electrode group GA and the second touch electrode group GB may be disposed on the left and the right of the panel 100. Also, the first touch electrode group GA and the second touch electrode group GB may include a different number of touch electrodes.

The touch electrode information may be applied for each touch electrode group, and thus, a configuration of the touch sensing unit 600 is simplified.

Hereinafter, as illustrated in FIG. 4, a case where the touch electrodes 510 are divided into the two touch electrode groups GA and GB and the first touch electrode group GA and the second touch electrode group GB include a same number of touch electrodes will be described as an example of the present invention.

Figure 5:
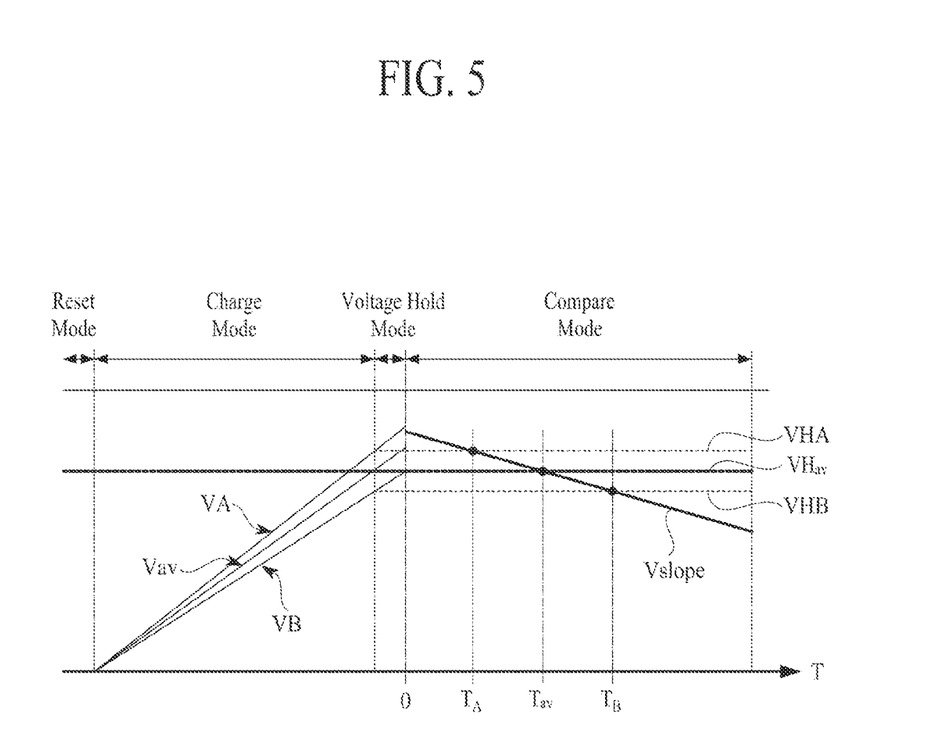
FIG. 5 is an exemplary diagram showing a deviation of touch electrodes which occurs in a display device according to an embodiment of the present invention.

FIG. 5 is an exemplary diagram showing a deviation of touch electrodes which occurs in a display device according to an embodiment of the present invention.

In FIG. 5, a touch voltage referred to by VA may denote an average of touch voltages (hereinafter simply referred to as a first touch voltage) at the first touch electrode group GA illustrated in FIG. 4, and a touch voltage referred to by VB may denote an average of touch voltages (hereinafter simply referred to as a second touch voltage) at the second touch electrode group GB. In FIG. 5, a touch voltage referred to by Vav may denote an average of touch voltages of the touch electrodes illustrated in FIG. 4, or when the touch electrodes have an ideal characteristic, the touch voltage referred to by Vav may denote an average of touch voltages of the touch electrodes. Hereinafter, a case where Vav is an average value (hereinafter simply referred to as an average touch voltage) of the touch voltages of the touch electrodes illustrated in FIG. 4 will be described as an example of the present invention.

The values may be values which are calculated by a test device in a process of manufacturing a display device.

In FIG. 5, VHA may refer to a hold voltage (hereinafter simply referred to as a first hold voltage) of the first touch voltage VA, VHB may refer to a hold voltage (hereinafter simply referred to as a second hold voltage) of the second touch voltage VB, and VHav may refer to a hold voltage (hereinafter simply referred to as an average hold voltage) of the average touch voltage Vav.

Referring to a graph shown in FIG. 5, the first touch voltage VA more rapidly increases than the average touch voltage Vav, and the second touch voltage VB more gently increases than the average touch voltage Vav.

Therefore, the first hold voltage VHA and the second hold voltage VHB may have values different from the average hold voltage VHav.

Accordingly, it can be seen that an electrical characteristic of the first touch electrode group GA differs from that of the second touch electrode group GB.

In this case, even when the same current is applied to the touch electrodes and there is no touch in all the touch electrodes, a time TA when the slope voltage Vslope reaches the first hold voltage VHA may differ from a time TB when the slope voltage Vslope reaches the second hold voltage VHB.

Therefore, different touch results may occur in the touch electrodes included in the first touch electrode group GA and the touch electrodes included in the second touch electrode group GB.

Moreover, even when the same current is applied to the touch electrodes and there are touches in all the touch electrodes, different touch results may occur in the touch electrodes.

The present invention prevents the above-described results. To this end, the first touch voltage VA, the second touch voltage VB, the first hold voltage VHA, the second hold voltage VHB, and the average hold voltage may be respectively measured by various test devices in a process of manufacturing a display device.

The values may be measured, and then, a compensation value for compensating for the values may be calculated by using two embodiments to be described below. The compensation value may be stored in the storage unit 700, and when power is supplied to the display device which stores the compensation value, the touch sensing unit 600 may drive the touch electrodes by using the compensation value.

Figure 6:
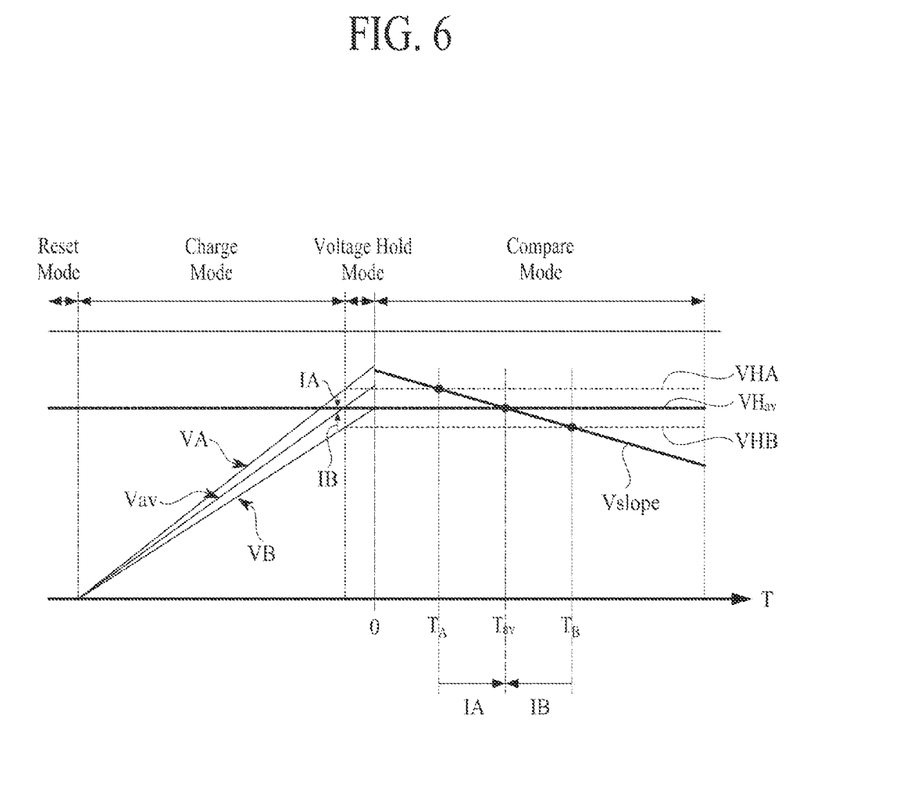
FIG. 6 is an exemplary diagram for describing a display device according to a first embodiment of the present invention.
Figure 7:
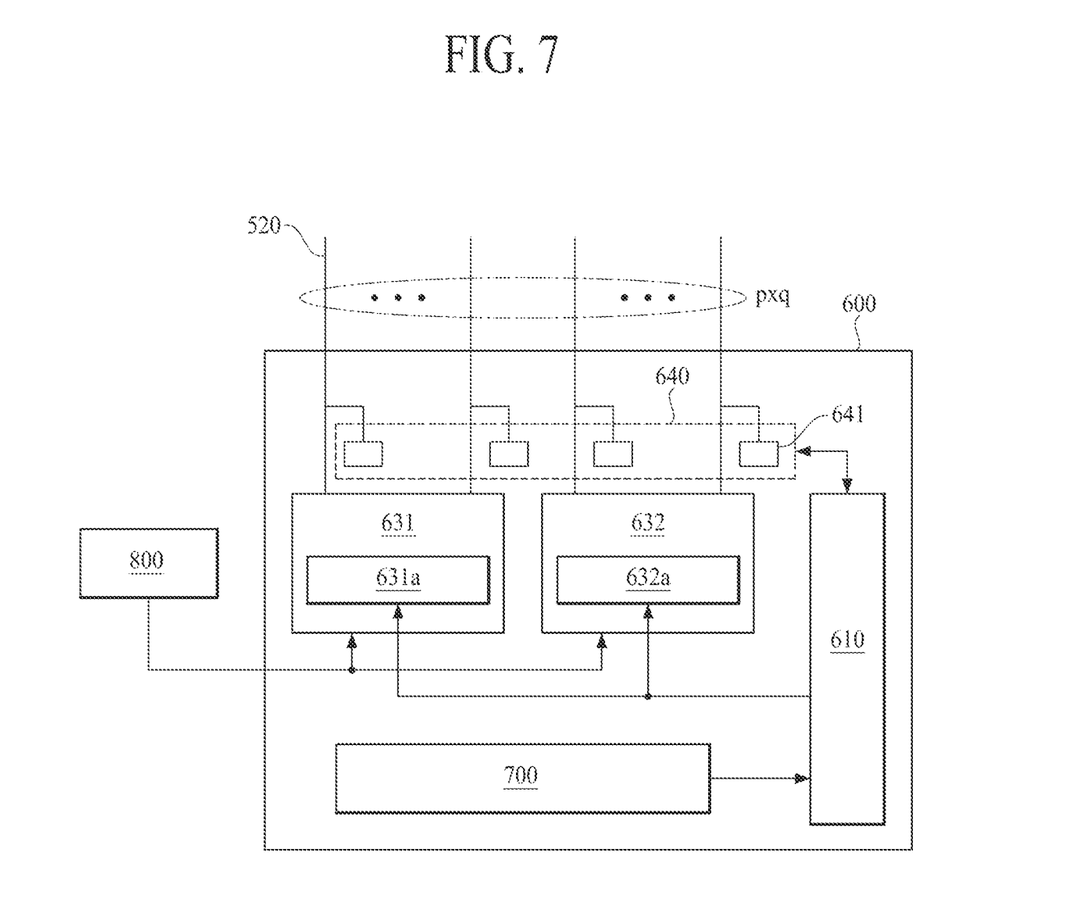
FIG. 7 is an exemplary embodiment illustrating a configuration of a touch sensing unit applied to the display device according to the first embodiment of the present invention.

FIG. 6 is an exemplary diagram for describing a display device according to a first embodiment of the present invention, and FIG. 7 is an exemplary embodiment illustrating a configuration of a touch sensing unit applied to the display device according to the first embodiment of the present invention.

As illustrated in FIGS. 2, 4 and 7, the display device according to the first embodiment of the present invention may include: a panel 100 into which a self-capacitive touch panel 500 including a plurality of touch electrodes 510 is built; a storage unit 700 that stores pieces of touch electrode information about characteristics of the touch electrodes 510; and a touch sensing unit 600 that changes the driving conditions of the touch electrodes 510 by using the pieces of touch electrode information, and by using a plurality of sensing signals respectively received from the touch electrodes 510, determines whether the touch panel 500 is touched.

The storage unit 700, as illustrated in FIGS. 2 and 7, may be included in the touch sensing unit 600, or may be provided independently from the touch sensing unit 600.

The touch electrode information about each of the touch electrodes 510 may be stored in the storage unit 700. In this case, the touch sensing unit 600 may separately drive the touch electrodes 510, based on the pieces of touch electrode information.

The touch electrodes 510 may be divided into at least two touch electrode groups. In this case, the storage unit 700 may store the pieces of touch electrode information about the respective touch electrode groups. The touch sensing unit may drive the touch electrode groups under separate conditions, based on the pieces of touch electrode information.

For example, as illustrated in FIG. 4, the touch electrodes 510 may be divided into the first touch electrode group GA and the second touch electrode group GB. In this case, the storage unit 700 may store pieces of touch electrode information about the first touch electrode group GA and the second touch electrode group GB. The touch sensing unit 600 may drive the touch electrodes included in the first touch electrode group GA and the touch electrodes included in the second touch electrode group GB under different conditions, based on the pieces of touch electrode information.

In the first embodiment of the present invention, the touch electrode information may include one or more current parameters providing information about a current which is to be supplied to the touch electrodes included in the touch electrode groups, and currents having different levels may be supplied to the touch electrode groups, based on the touch electrode information.

For example, each of the first and second touch voltages VA and VB which are measured in response to applying a test current to the first and second groups of electrodes during a process of manufacturing a display device may be expressed as the graph of FIG. 5. When the first and second touch voltages VA and VB have the same value as that of the average hold voltage VHav, a deviation of the touch electrodes is removed. In this case, a reliability of an operation of determining whether there is a touch based on the touch electrodes increases.

In order for the first and second touch voltages VA and VB to have the same value as that of the average hold voltage VHav, as shown in FIG. 6, the display device according to the first embodiment of the present invention may use a method that decreases a level of a current (relative to the test current from which the measurement is based) supplied to each of the touch electrodes included in the first touch electrode group GA and increases a level of a current (relative to the test current from which the measurement is based) supplied to each of the touch electrodes included in the second touch electrode group GB.

For example, since V=IR, when a current is reduced, a voltage may be reduced, and when a current increases, a voltage may increase.

Therefore, when a current supplied to each of the touch electrodes included in the first touch electrode group GA is reduced by IA, an average value of the touch voltages of the touch electrodes included in the first touch electrode group GA may have a value close to the average touch voltage Vav. In this case, an average of the hold voltages of the touch electrodes included in the first touch electrode group GA may also have a value close to the average hold voltage VHav.

Moreover, when a current supplied to each of the touch electrodes included in the second touch electrode group GB increases by IB, an average value of the touch voltages of the touch electrodes included in the second touch electrode group GB may have a value close to the average touch voltage Vav. In this case, an average of the hold voltages of the touch electrodes included in the second touch electrode group GB may also have a value close to the average hold voltage VHav.

Accordingly, a deviation of the touch electrodes included in the first touch electrode group GA and the touch electrodes included in the second touch electrode group GB is reduced.

A manufacturer of a display device may calculate a current, which is to be supplied to each of the touch electrodes included in the first touch electrode group GA, and a current which is to be supplied to each of the touch electrodes included in the second touch electrode group GB, based on various simulations and experiments.

For example, a first current supplied to the first touch electrode group GA may be a current which is reduced by IA in comparison with a current corresponding to the average touch voltage Vav, and a second current supplied to the second touch electrode group GB may be a current which increases by IB in comparison with the current corresponding to the average touch voltage Vav.

Pieces of information about the calculated first and second currents may be stored as the pieces of touch electrode information in the storage unit 700 including, for example, a current parameter indicating a level of current to apply to each touch electrode group GB.

When the display device equipped with the storage unit 700 where the pieces of information about the currents (e.g., current parameters) are stored as the pieces of touch electrode information is driven, the touch sensing unit 600 may separately drive the touch electrodes included in the first touch electrode group GA and the touch electrodes included in the second touch electrode group GB, based on the currents.

To this end, as illustrated in FIG. 7, the touch sensing unit 600 may include: a first current supplier 631 that supplies the first current to the touch electrodes included in the first touch electrode group GA according to a first current parameter (e.g., a first current level); a second current supplier 632 that supplies the second current to the touch electrodes included in the second touch electrode group GB according to a second current parameter (e.g., a second current level); a sensing signal receiver that receives the sensing signals from the touch electrodes 510; and a touch controller 610 that controls the first current output from the first current supplier 631 to the touch electrodes and the second current output from the second current supplier 632 to the touch electrodes by using the pieces of touch electrode information transferred from the storage unit 700.

First, the first current supplier 631 may receive a current from a current generator 800 and supply the first current, having a specific value, to a plurality of touch electrodes connected to the first current supplier 631 according to control by the touch controller 610.

To this end, the first current supplier 631 may include a first current converter 631a that varies the current, supplied from the current generator 800, to the first current according to control by the touch controller 610.

Second, the second current supplier 632 may receive the current from the current generator 800 and supply the second current, having a specific value, to a plurality of touch electrodes connected to the second current supplier 632 according to control by the touch controller 610.

To this end, the second current supplier 632 may include a second current converter 632a that varies the current, supplied from the current generator 800, to the second current according to control by the touch controller 610.

Third, the sensing signal receiver 640 may include a receiver 641 that is connected to the touch electrodes and receives the sensing signals.

A method of driving the display device according to the first embodiment of the present invention will be briefly described below.

In a process of manufacturing a display device, the first current and the second current may be calculated, and the calculated first and second currents may be stored as the pieces of touch electrode information in the storage unit 700.

When power is supplied to the display device which stores the pieces of touch electrode information, the touch sensing unit 600 may read the pieces of touch electrode information about the characteristics of the touch electrodes from the storage unit 700.

The touch sensing unit 600 may change the driving conditions of the touch electrodes 510 included in the panel 500 by using the pieces of touch electrode information and determine whether there is a touch in the touch panel 500, by using the sensing signals respectively received from the touch electrodes 510.

In this case, when the pieces of touch electrode information include information about a current which is to be supplied to at least one touch electrode, and currents having different levels may be respectively supplied to the touch electrodes, based on the pieces of touch electrode information.

Particularly, in the embodiment where the touch electrodes are divided into the first touch electrode group GA and the second touch electrode group GB, the pieces of touch electrode information may include pieces of information about the first and second currents.

Therefore, the touch controller 610 may control the first current converter 631a and the second current converter 632a so that the first current supplier 631 supplies the first current to the touch electrodes included in the first touch electrode group GA and the second current supplier 632 supplies the second current to the touch electrodes included in the second touch electrode group GB.

According to the first embodiment of the present invention, a deviation of the touch electrodes is compensated for by a simple method of controlling a level of a current supplied to each of the touch electrodes.

Figure 8:
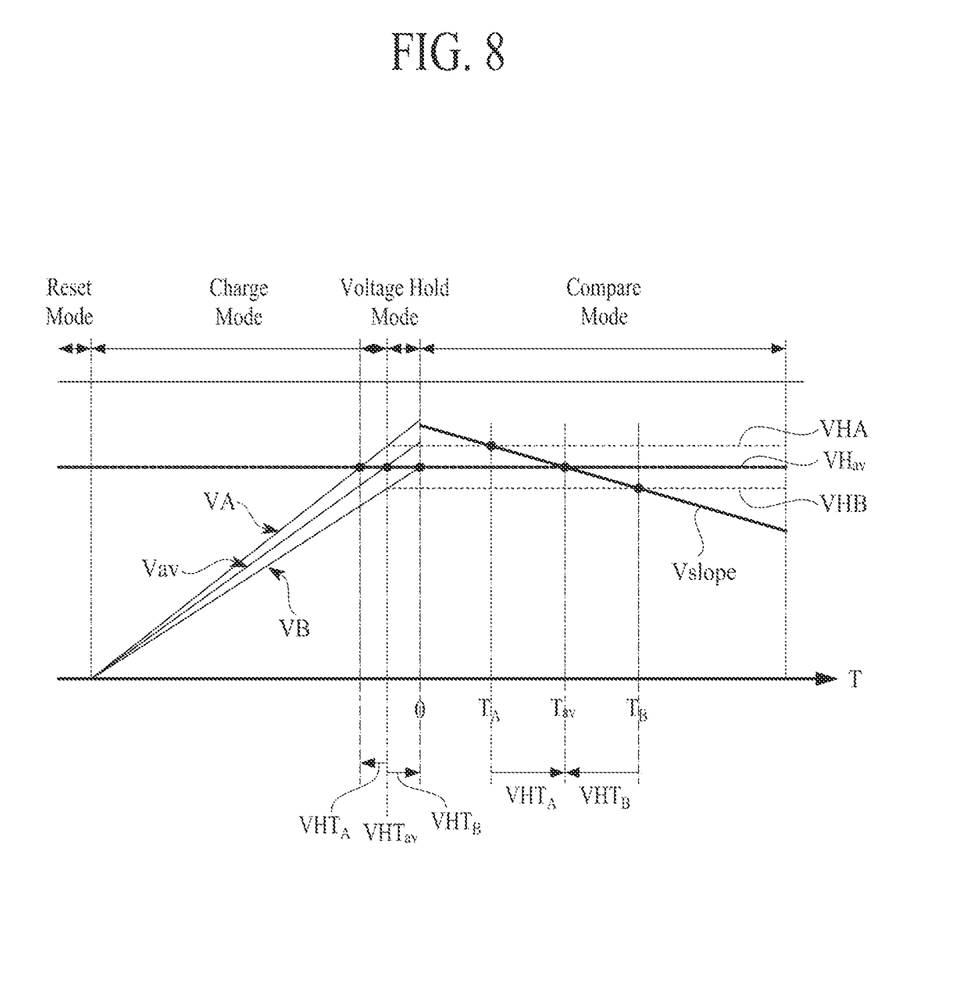
FIG. 8 is an exemplary diagram for describing a display device according to a second embodiment of the present invention.
Figure 9:
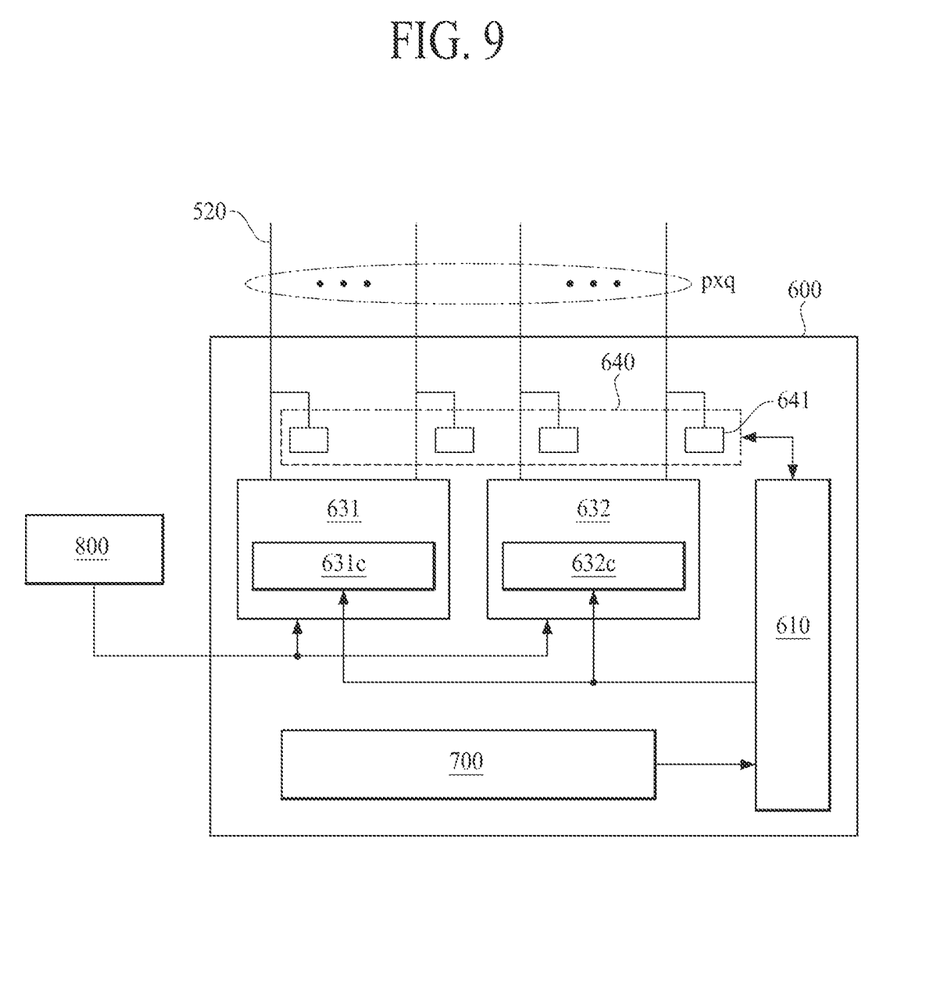
FIG. 9 is an exemplary embodiment illustrating a configuration of a touch sensing unit applied to the display device according to the second embodiment of the present invention.

FIG. 8 is an exemplary diagram for describing a display device according to a second embodiment of the present invention, and FIG. 9 is an exemplary embodiment illustrating a configuration of a touch sensing unit applied to the display device according to the second embodiment of the present invention. Hereinafter, details which are the same as or similar to the above-described details of the display device according to the first embodiment of the present invention are not repeated or will be briefly described.

As illustrated in FIGS. 2, 4 and 9, the display device according to the second embodiment of the present invention may include: a panel 100 into which a self-capacitive touch panel 500 including a plurality of touch electrodes 510 is built; a storage unit 700 that stores pieces of touch electrode information about characteristics of the touch electrodes 510; and a touch sensing unit 600 that changes the driving conditions of the touch electrodes 510 by using the pieces of touch electrode information, and by using a plurality of sensing signals respectively received from the touch electrodes 510, determines whether the touch panel 500 is touched.

In the second embodiment of the present invention, the pieces of touch electrode information may include a current parameter providing information about a period where a current is supplied to the touch electrodes (e.g., a duration of the charge period) included in the touch electrode groups, and the touch sensing unit 600 may supply the current to the touch electrode groups during different periods, based on the pieces of touch electrode information.

For example, each of the first and second touch voltages VA and VB which are measured in response to applying a test current to first and second touch electrode groups during a process of manufacturing a display device as expressed in the graph of FIG. 5. When the first and second touch voltages VA and VB have the same value as that of the average hold voltage VHav, a deviation of the touch electrodes is removed. In this case, a reliability of an operation of determining whether there is a touch based on the touch electrodes increases.

In order for the first and second touch voltages VA and VB to have the same value as that of the average hold voltage VHav, as shown in FIG. 8, the display device according to the second embodiment of the present invention may use a method that decreases a level of a current (relative to the test current from which the measurement is based) supplied to each of the touch electrodes included in the first touch electrode group GA and increases a level of a current (relative to the test current from which the measurement is based) supplied to each of the touch electrodes included in the second touch electrode group GB.

For example, when a period where a current is supplied to the first touch voltage VA is shortened, the voltage hold mode more early arrives, and thus, the first hold voltage based on the first touch voltage VA is lowered.

Therefore, when a period where a current is supplied to the touch electrodes included in the first touch electrode group GA is shortened, an average value VHA of the hold voltages of the touch electrodes included in the first touch electrode group GA may have a value close to the average hold voltage VHav.

Moreover, when a period where a current is supplied to the touch electrodes included in the second touch electrode group GB increases, an average value VHB of the hold voltages of the touch electrodes included in the second touch electrode group GB may have a value close to the average hold voltage VHav.

Accordingly, a deviation of the touch electrodes included in the first touch electrode group GA and the touch electrodes included in the second touch electrode group GB is reduced.

To provide an additional description, in the display device according to the second embodiment of the present invention, when a starting time of the charge mode for the first touch electrode group GA is equal to that of the charge mode for the second touch electrode group GB and a timing of the compare mode for the first touch electrode group GA is equal to that of the compare mode for the second touch electrode group GB, a timing of the voltage hold mode may be changed. The timing of the voltage hold mode may be changed based on a period where a current is supplied to the first touch electrode group GA and the second touch electrode group GB.

Based on various simulations and experiments, the manufacturer of the display device may calculate a period, where a current is supplied to the touch electrodes included in the first touch electrode group GA, and a period where a current is supplied to the touch electrodes included in the second touch electrode group GB, in order for the first and second hold voltages VHA and VHB to have a value close to the average hold voltage VHav.

For example, a first current supply period where a current is supplied to the first touch electrode group GA may be a period where a current is reduced by $VHT_A$ in comparison with a timing of the voltage hold mode corresponding to the average touch voltage Vav, and a second current supply period where a current is supplied to the second touch electrode group GB may be a period where a current increases by $VHT_B$ in comparison with the timing of the voltage hold mode corresponding to the average touch voltage Vav.

Pieces of information about the calculated first and second current supply periods may be stored as current parameters describing pieces of touch electrode information in the storage unit 700.

When the display device equipped with the storage unit 700 where the pieces of information about the current supply periods are stored as the pieces of touch electrode information is driven, the touch sensing unit 600 may separately drive the touch electrodes included in the first touch electrode group GA and the touch electrodes included in the second touch electrode group GB, based on the current supply periods.

To this end, as illustrated in FIG. 9, the touch sensing unit 600 may include: a first current supplier 631 that supplies a current to the touch electrodes included in the first touch electrode group GA; a second current supplier 632 that supplies the current to the touch electrodes included in the second touch electrode group GB; a sensing signal receiver that receives the sensing signals from the touch electrodes 510; and a touch controller 610 that controls the current output from the first current supplier 631 to the touch electrodes and the current output from the second current supplier 632 to the touch electrodes by using the pieces of touch electrode information transferred from the storage unit 700.

First, the first current supplier 631 may receive the current from the current generator 800 and supply the current to a plurality of touch electrodes connected to the first current supplier 631 according to control by the touch controller 610.

In this case, the first current supplier 631 may supply the current to the touch electrodes during only the first current supply period.

To this end, the first current supplier 631 may include a first current supply period controller 631c that allows the current, supplied from the current generator 800, to be output to the touch electrodes during only the first current supply period according to control by the touch controller 610.

Second, the second current supplier 632 may receive the current from the current generator 800 and supply the current to a plurality of touch electrodes connected to the second current supplier 632 according to control by the touch controller 610.

In this case, the current output from the second current supplier 632 may be equal to the current output from the first current supplier 631.

Moreover, the second current supplier 632 may supply the current to the touch electrodes during only the second current supply period.

To this end, the second current supplier 632 may include a second current supply period controller 632c that allows the current, supplied from the current generator 800, to be output to the touch electrodes during only the second current supply period according to control by the touch controller 610.

Third, the sensing signal receiver 640 may include a receiver 641 that is connected to the touch electrodes and receives the sensing signals.

A method of driving the display device according to the second embodiment of the present invention will be briefly described below.

In a process of manufacturing a display device, the first current supply period and the second current supply period may be calculated, and the calculated first and second current supply periods may be stored as the pieces of touch electrode information in the storage unit 700.

When power is supplied to the display device which stores the pieces of touch electrode information, the touch sensing unit 600 may read the pieces of touch electrode information about the characteristics of the touch electrodes from the storage unit 700.

The touch sensing unit 600 may change the driving conditions of the touch electrodes 510 included in the panel 500 by using the pieces of touch electrode information and determine whether there is a touch in the touch panel 500, by using the sensing signals respectively received from the touch electrodes 510.

In this case, when the pieces of touch electrode information include information about a current which is to be supplied to at least one touch electrode, and currents having different levels may be respectively supplied to the touch electrodes, based on the pieces of touch electrode information.

Particularly, in the embodiment where the touch electrodes are divided into the first touch electrode group GA and the second touch electrode group GB, the pieces of touch electrode information may include pieces of information about the first and second current supply periods where the current is supplied to the touch electrodes included in the touch electrode groups.

Therefore, the touch controller 610 may control the first current supply period controller 631c and the second current supply period controller 632c so that the first current supplier 631 supplies the current to the touch electrodes included in the first touch electrode group GA during the first current supply period and the second current supplier 632 supplies the second current to the touch electrodes included in the second touch electrode group GB during the second current supply period.

According to the above-described embodiment of the present invention, a deviation of the touch electrodes is compensated for, and thus, a reliability of the touch panel 500 and the touch sensing unit 600 increases.

According to the second embodiment of the present invention, a deviation of the touch electrodes is compensated for by a simple method of controlling a period where the current is supplied to each of the touch electrodes.

As described above, according to the embodiments of the present invention, a deviation of touch electrodes is compensated for, and thus, a touch panel is normally driven.

Accordingly, a yield rate of a display device is maximized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for operating a touch panel display device comprising a first touch electrode group having a first plurality of touch electrodes and a second touch electrode group having a second plurality of touch electrodes, the method comprising:

supplying, for a first duration of time during a charge period, a first current having a first current level to the first plurality of touch electrodes, wherein the first current causes a first touch voltage of the first touch electrode group to increase from a first initial voltage level to a first final voltage level over the first duration of time;

supplying, for a second duration of time during the charge period, a second current having a second current level to the second plurality of touch electrodes, wherein the second current causes a second touch voltage of the second touch electrode group to increase from a second initial voltage level to a second final voltage level over the second duration of time, wherein the second current level differs from the first current level, and wherein the first current level, the first duration of time, the second current level, and the second duration of time are such that the first touch electrode group and the second touch electrode group are each charged to an approximately same touch voltage if a touch occurred in both the first touch electrode group and the second touch electrode group during the charge period, and are each charged to an approximately same non-touch voltage if the touch did not occur in either the first touch electrode group or the second touch electrode during the charge period;

holding the first touch voltage for the first touch electrode group at a first held voltage level during a voltage hold period following the charge period;

holding the second touch voltage for the second touch electrode group at a second held voltage level during the voltage hold period following the charge period;

generating, during a compare period following the voltage hold period, a reference voltage that decreases from an initial reference level at a compare period start time to a final reference voltage level at a compare period end time;

detecting a first period between the compare period start time and a first crossing time when the reference voltage drops below the first held touch voltage level;

detecting a second period between the compare period start time and a second crossing time when the reference voltage drops below the second held touch voltage level; and comparing the first period and the second period to a threshold period to determine whether a touch occurred in each of the first touch electrode group and the second touch electrode group.

2. The method of claim 1, wherein the first duration of time differs from the second duration of time.

3. The method of claim 1, wherein the first touch voltage is an average of touch voltages corresponding to the first plurality of touch electrodes, and wherein the second touch voltage is an average of touch voltages corresponding to the second plurality of touch electrodes.

4. A touch panel display device comprising:

a first touch electrode group having a first plurality of touch electrodes;

a second touch electrode group having a second plurality of touch electrodes;

a first current supplier circuit to supply a first current to the first touch electrode group, the first current having a first current level for a first duration of time during a charge period, the first current causing a first touch voltage of the first touch electrode to increase from a first initial voltage level to a first final voltage level over the first duration of time;

a second current supplier circuit to supply a second current to the second touch electrode group, the second current having a second current level for a second duration of time during the charge period, the second current causing a second touch voltage of the second touch electrode group to increase from a second initial voltage level to a second final voltage level over the second duration of time, wherein the second current level differs from the first current level, and wherein the first current level, the first duration of time, the second current level, and the second duration of time are such that the first touch electrode group and the second touch electrode group are each charged to an approximately same touch voltage if a touch occurred in both the first touch electrode group and the second touch electrode group during the charge period, and are each charged to an approximately same non-touch voltage if the touch did not occur in either the first touch electrode group or the second touch electrode during the charge period; and a sensing signal receiver circuit to hold a first touch voltage for the first touch electrode group at a first held voltage level following the first current supply period, to hold the second touch voltage for the second touch electrode group at a second held voltage level following the second current supply period, to generate, during a compare period following the voltage hold period, a reference voltage that decreases from an initial reference level at a compare period start time to a final reference voltage level at a compare period end time, to detect a first period between the compare period start time and a first crossing time when the reference voltage drops below the first held touch voltage level, to detect a second period between the compare period start time and a second crossing time when the reference voltage drops below the second held touch voltage level, and to compare the first period and the second period to a threshold period to determine whether a touch occurred in each of the first touch electrode group and the second touch electrode group.

5. The touch panel display device of claim 4, wherein the first duration of time differs from the second duration of time.

6. The touch panel display device of claim 4, wherein the first touch voltage is an average of touch voltages corresponding to the first plurality of touch electrodes, and wherein the second touch voltage comprises an average of touch voltages corresponding to the second plurality of touch electrodes.

\* \* \* \* \*